United States Patent [19]
Bouwknegt et al.

[11] 4,268,469
[45] May 19, 1981

[54] METHOD OF ENVELOPING ARTICLES WITH THERMOPLASTIC STRIP MATERIAL

[75] Inventors: Jan Bouwknegt; Hendrik J. Verbeek; Gerard J. Scholten, all of Eindhoven, Netherlands

[73] Assignee: U.S. Philips Corporation, New York, N.Y.

[21] Appl. No.: 48,949

[22] Filed: Jun. 15, 1979

Related U.S. Application Data

[63] Continuation of Ser. No. 805,966, Jun. 13, 1977, abandoned, which is a continuation of Ser. No. 509,479, Sep. 26, 1974, abandoned.

[30] Foreign Application Priority Data

Oct. 4, 1973 [NL] Netherlands .......................... 7313628

[51] Int. Cl.³ ...................... B29C 27/00; B29D 27/00
[52] U.S. Cl. .................................. 264/138; 264/248; 264/272; 264/278; 264/321; 264/322
[58] Field of Search .............. 264/321, 272, 322, 275, 264/278, 248; 206/523; 53/477–479; 156/245

[56] References Cited

U.S. PATENT DOCUMENTS

| | | | |
|---|---|---|---|
| 2,210,509 | 8/1940 | Strauch | 53/64 |
| 3,164,749 | 1/1965 | Berge et al. | 206/523 |
| 3,265,945 | 8/1966 | Jennings et al. | 53/64 |
| 3,286,834 | 11/1966 | English | 206/523 |
| 3,318,744 | 5/1967 | Hurley | 156/322 |
| 3,346,686 | 10/1967 | Collins | 264/321 |
| 3,442,828 | 5/1969 | Engelhardt et al. | 264/272 |

OTHER PUBLICATIONS

Benning, Plastic Foams, Wiley-Interscience, N.Y. (1970), pp. 3, 54–55, 192, 193, 322, 323.

Primary Examiner—W. E. Hoag
Attorney, Agent, or Firm—Thomas A. Briody; William J. Streeter; Rolf E. Schneider

[57] ABSTRACT

A method of enveloping an electrical component in a thermoplastic material is provided. The facing surfaces of two parallel spaced strips of a closed-cell cellular thermoplastic material are heated to a temperature above the softening or melting temperature of such thermoplastic material while maintaining the temperature of the remainder of each strip below such softening or melting temperature. In this condition the two strips and the electrical component are introduced into a mould with the component between the heated surfaces; and the mould is closed about the strips to plastically deform the same and to encase the component therebetween.

3 Claims, 10 Drawing Figures

METHOD OF ENVELOPING ARTICLES WITH THERMOPLASTIC STRIP MATERIAL

This is a continuation of application Ser. No. 805,966, filed June 13, 1977, which is a continuation of application Ser. No. 509,479, filed Sept. 26, 1974, both being now abandoned.

This invention relates to a method of enveloping articles, in particular electrical components, with thermoplastic strip material, in which two strips of thermoplastic material extending on either side of the article are pressed onto the article and against each other with their edges projecting beyond the circumference thereof, and in which the edges pressed against each other are bonded together.

Articles, for example, electrical components, are usually provided with an envelope which protects the articles from the influences of the atmosphere, for example, moisture and dust, so as to obtain a permanent good operation and a long life. It is known to envelop articles, for example foil capacitors, semiconductor devices, and so on, with thermoplastic material by melting said material and injecting it under pressure in a mould in which the component to be enveloped is present. The melted thermoplastic material solidifies upon cooling. Since much thermal energy has to be dissipated, the process times are long. A reasonable yield can be obtained by simultaneously enveloping several articles in a multiple mould. In that case, however, the moulds become very complicated and expensive, while the operation is very critical.

It is furthermore known to envelop articles with synthetic foils. In this case the edges of the foil strips are bonded by means of an adhesive, a weld or by heating the edges. Such known method suffers from the drawback that the cycle times remain long. The provision of an adhesive is a complicated and critical job and for obtaining a good seal it is required that the foil strips remain pressed against each other for a comparatively long period of time. Welded joints possess an undesired restriction as regards the shape of the product, while air inclusions in the envelope can hardly be avoided. Upon heating the edges of the foil strips, said edges have to be heated to above the softening temperature or melting temperature of the material. The thorough heating of said edges in a short time is far from simple; since the edges have also to be cooled again the cycle times in their manufacture are long. The known methods hardly permit of an economically remunerative production.

It is the object of the present invention to provide a method of enveloping articles, for example, electrical components, in which the means used are comparatively simple and in which the time required for enveloping is extremely short, while a qualitatively excellent product is obtained. According to the invention this object is achieved in that thermal energy is supplied from without to one of the two surfaces of each of the two strips in such manner that the strip material on the relevant surface is heated to above the softening temperature or melting temperature, while the remaining part of the strip material remains below the softening temperature or melting temperature and that in this condition the two strips with the softened or melted surfaces facing each other are pressed onto the article and, on the side thereof, are pressed against each other and a rapid bond is produced by cooling the softened or melted layer.

The heating of only a thin layer of the strip to above the softening or melting temperature can be carried out with simple means and in a rapid manner. During the pressing together, the softened or melted surface parts adhere to the article and the edges thereof adhere together. The thermal energy to be dissipated is very small as a result of the small thickness of the layer; consequently the time to realize the bond can be extremely short. This enables articles to be enveloped at a very high rate and thus to obtain an economically remunerative process.

In an embodiment of the method according to the invention, the supply of thermal energy with which the softening or melting of the material of the relevant strip surface is obtained, is carried out in a second heating phase which succeeds a first heating phase in which the two strips as a whole are heated at an elevated temperature which is below the softening or melting temperature of the thermoplastic material. It has been found that the relevant surfaces of the entirely pre-heated strips can be softened or melted with very simple means in a second heating phase, the adjustment of the temperature of the second heating phase being little critical. This method is readily reproducible and the heating times may be short.

A favourable effect is obtained when the temperature at which the two strips as a whole are heated is ten or a few tens of degrees Celsius lower than the softening or melting temperature of the strip material.

For a rapid cooling of the parts to be joined it is desired that the softened or melted surface layer be thin. On the other hand, a small lateral displacement of softened or melted material is desired so as to prevent damage to the article during enveloping. Thus the softened or melted layer must not be too thin either. A favourable thickness of the melted layer, for example on the order of magnitude of 150 microns, can be realized, when, according to a further embodiment of the invention, the heating on one side of the strips which produces softening or melting of the surface material is continued only to such an extent that, at the instant at which the strips are pressed onto the article and against each other, the temperature gradient produced by said heating extends over less than half the thickness of the strip.

It has proved very favourable that the two strips are brought under a pressure which is increased to a previously determined value in a mould which is closed on all sides, in which a plastic deformation of the strip material is produced and in which the strips are given the shape of a dish the outer shape of which is determined by the mould closed on all sides and by the surface of members exerting the pressure on the strips. The bonding and shaping of the strips can now be carried out simultaneously so that a desired envelope is obtained at a high production rate.

In a preferred embodiment according to the invention an unheated mould is used during the enveloping treatment, which mould has two unheated dies which can be moved towards each other, in which the article to be enveloped is arranged inside the mould and the strips are introduced into the mould as end parts of tapes having a softened or melted surface and are cut from the tapes at that area by co-operation of the dies and the mould, after which, when the movement of the two dies is continued, the strips are pressed onto and around the article and against each other with their projecting edges. This preferred embodiment is distinguished by its simplicity, the unheated mould and dies contributing to a rapid dissipation of thermal energy so that a short bonding time is possible. A desired external shape of the envelope can also be obtained by an adapted design of the mould and the dies.

In a further embodiment of the method the heating which results in softening or melting of the facing surfaces of the end parts of the tapes is produced by at least one heating element which is arranged between the parallel extending end parts and near the introduction apertures for the tapes in the mould and which extends parallel to a tape over a length which is at least equal to the cut off length of the strip to be processed in the mould.

In carrying out the heating of the foil strips in two phases, the first heating is preferably carried out in a furnace which surrounds the foil tapes over a length which is a multiple of the cut off length.

In a very favourable embodiment according to the invention the thermoplastic strip material used has miniscule cavitites closed in themselves. These cavities are extremely favourable to achieve a high production rate and to obtain a product having a desired external shape. The pressure which is exerted to bond the strips to the article and together also serves to give the envelope an outer shape which is adapted to the mould cavity and the dies. Due to the presence of the cavities a larger deformability with a smaller plastic deformation of the material itself is obtained; only small residual stresses will occur in the deformed material and the desired shape is rapidly obtained. At the area of the article the local pressure will be highest and the cavities are most squeezed, at the level of the edges the local pressure is smaller and the cavities are less squeezed. The squeezing to a greater or less extent of the cavities is of a permanent nature so that a desired outer shape of the envelope of the article can easily be obtained. In addition, the deformation in the strip material itself can be very small, which is favourable to obtaining a good joint and for the rate at which the method can be carried out.

The thermoplastic material preferably consists of polypropylene. The percentage of cavities or cells in the polypropylene foil is preferably chosen to be 10% of higher. It has been found that in this manner an extremely suitable envelope is obtained which protects the article excellently, while the enveloping times can be minimum.

The invention will now be described in greater detail with reference to the accompanying drawings, in which.

Figure 1:
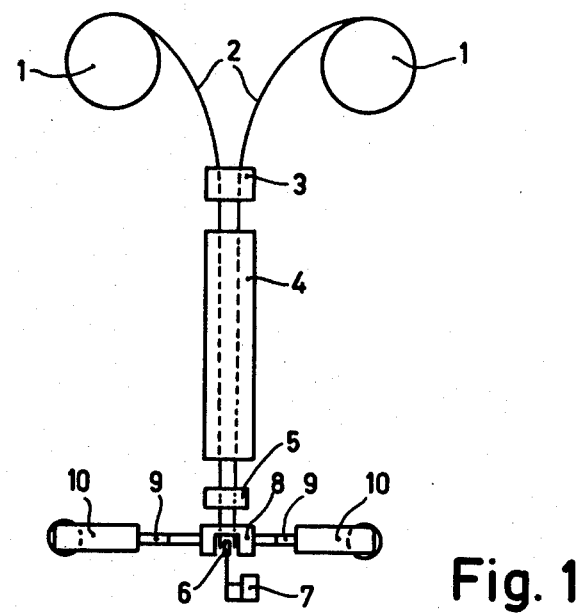
FIG. 1 is a diagrammatic representation of an arrangement with which the method can be carried out.

FIG. 1 illustrates two tapes 2 which are unwound from respective storage reels 1; the desired displacement of the tapes 2 is carried out by means of a tape supply mechanism 3. As an enveloping material is used a thermoplastic synthetic resin, polypropylene, for example, there is very suitable. The material preferably has miniscule gas cavities or cells which are closed in themselves; 25% of gas cavities has proved very favourable. The gas cavities may be formed, for example, by the addition of a foam to the granular starting material; at the temperature used for extrusion to the tape shape, for example 180° C., the foam forms gas-filled bubbles in the foil material.

In a pre-heating furnace 4 the tapes 2 are heated to a temperature which is ten or a few tens of °C. below the softening or melting temperature of the tape material, for example, a temperature of 150° C. An after-heating element 5 heats a thin layer of the facing surface of the tapes 2 to a temperature above the softening or melting point of the tape material, in this embodiment, for example, 210° C. Although the heating of the relevant surfaces is possible in one temperature treatment, the described two-phase heating is preferred. The two-phase heating has proved extremely suitable to obtain a surface layer of melted tape material in a short period of time and with the use of simple means, the temperature adjustment both of the pre-heating furnace and of the after-heating element being little critical. The thickness of the melted surfac e layer may be, for example, 150 microns.

A product 6 which is to be enveloped and which is supplied or removed on a support 7 is present in a mould 8. Dies 9 can exert pressure by means of a pressure mechanism 10 on the material strips introduced into the mould. The melted surface layers of the strips are pressed against and around the product 6 and their projecting edges are pressed against each other whereby, due to the small thickness of the melted surface layer, hardening occurs very rapidly and a bond of the two strips is produced. In the mould, the enveloping material may be given a desired outer shape. The preheating in furnace 4 is extremely favourable to obtain a rapid plastic deformation of the strip material in the mould. The enveloped article may now be removed from the mould and the process can be repeated.

Figure 2:
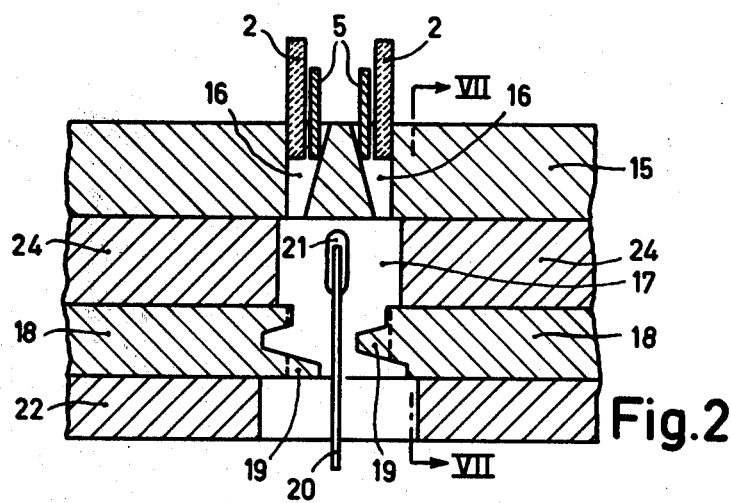
FIG. 2 shows an initial position of the foil tapes relative to the mould.
Figure 4:
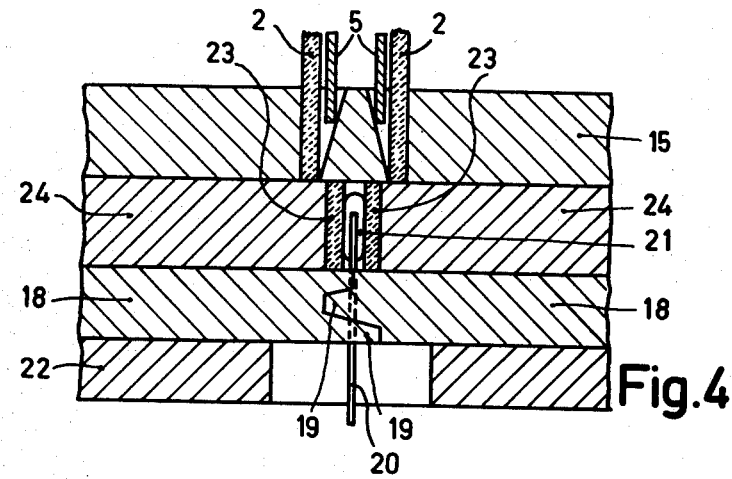
FIG. 4 shows the closing of the mould and the cutting of the foil strips.
Figure 7:
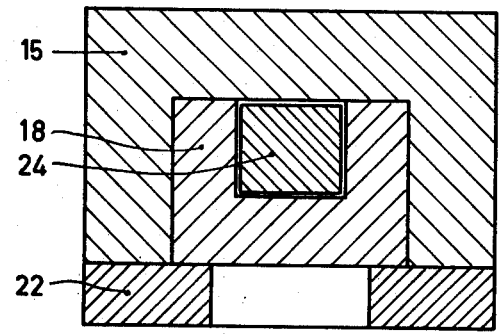
FIG. 7 is a cross-sectional view taken on the line VII—VII of FIG. 2.

In FIG. 2 the ends of the tapes 2 of thermoplastic material have been moved past after-heating elements 5. The after-heating elements 5 ensure that a surface layer of a small thickness, for example 150 microns, of the ends of the tapes 2 is heated to above the melting temperature, for example, to the said 210° C. The length of the after-heating elements 5 is equal to or longer than the length of the strips 23 to be processed in the mould (FIG. 4). A mould housing 15 provides slot-like apertures 16 through which the tapes 2 can be introduced into the mould cavity 17. The mould consists of two parts 18 having projections 19 co-operating with each other. During enveloping, conductors 20 of an electric component 21, for example, a capacitor, can be held in the projections 19. Dies 24 can reciprocate in the mould 18. The mould housing 15 includes a closing plate 22 which is clearly shown in the cross-sectional view of FIG. 7.

Figure 3:
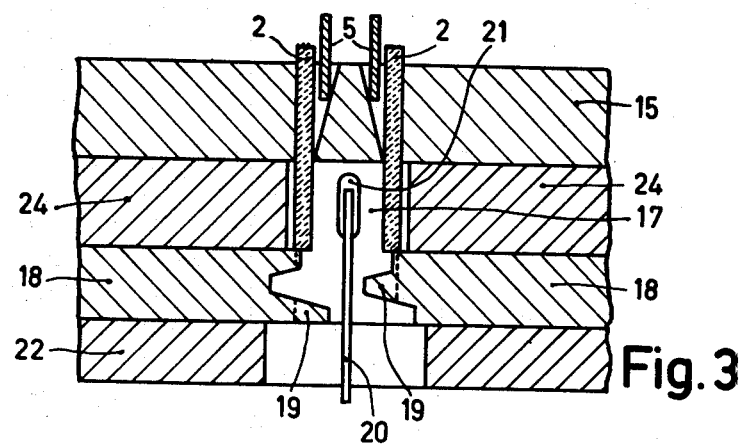
FIG. 3 shows the ends of the foil tapes introduced to into the mould.
Figure 5:
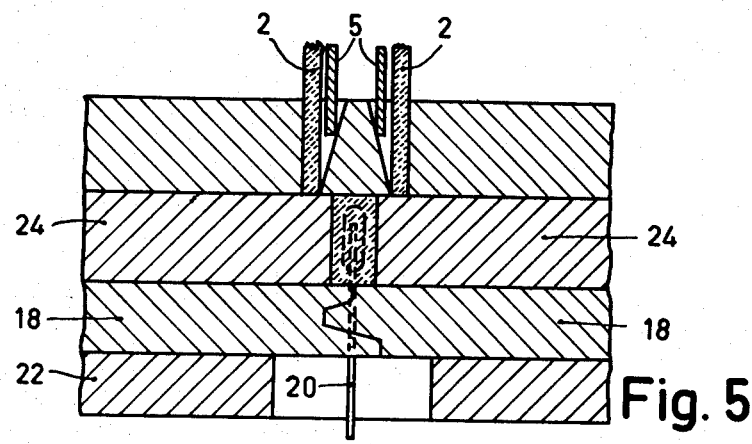
FIG. 5 shows the exertion of pressure on the foil strips.
Figure 6:
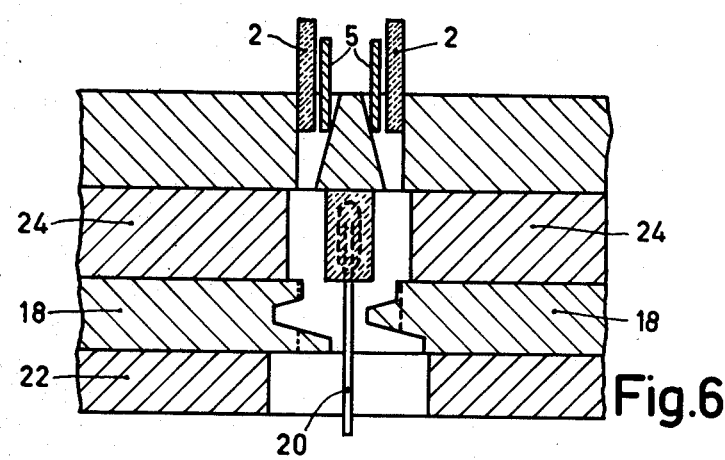
FIG. 6 shows the opening of the matrix and the withdrawal of the dies.

FIG. 3 shows that the ends of the tapes 2 have been introduced into the mould cavity 17 until they impact against parts of the mould 18. Said ends are heated to above the melting temperature on their facing surfaces. The mould parts 18 are now closed (FIG. 4), in which case they hold the electric component 21 by the wires 20. The dies 24 are also moved towards each other. As shown in FIG. 4 the result is that a strip 23 is cut off each tape 2 and is moved against the component 21. As shown in FIG. 5, the movement of the dies 24 is continued so that the melted surface layers of the foil strips 23 are pressed against and around the electrical component 21 and the projecting edges of the strips are pressed against each other. The mould 18 and the dies 24 are not heated and therefore a rapid cooling of the thin melted surface layers of the strips 23 occurs upon pressing so that an adhesion to the component 21 and a bond of the edges of the strips 23 are very rapidly produced. The strips 23 are compressed to an outer shape which is adapted to the mould 18 and the dies 24. The presence of gas cavities or cells closed in themselves in the strip material is of particular importance, as will be explained hereinafter. The mould 18 is then opened (FIG. 6) and the dies 24 are also moved back so that the enveloped product is entirely free and can be removed after which the manufacture of the following product can begin.

The recognition that only a thin surface layer of the strips 23 needs to be heated to the melting temperature has enabled the envelopment of components at a very high rate. The use of an unheated mould and of unheated dies 24 upon pressing the foil strips 23 is favourable to obtaining nearly immediately a hardening of the parts to be bonded. The manufacture of five products per second has proved readily achievable and an increase of the production rate is also possible. This makes the described method economically very attractive.

Figures 8, 9:
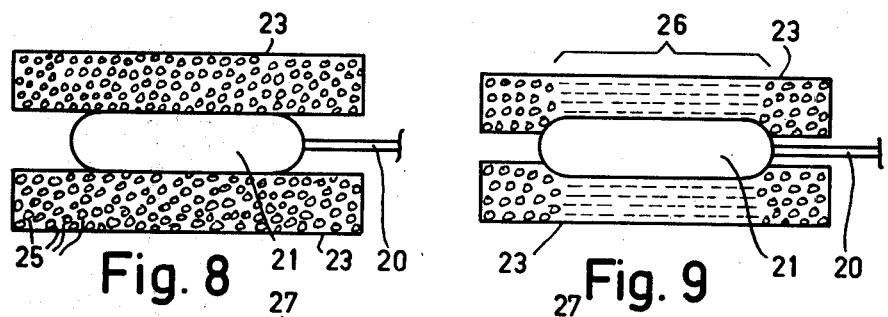
FIGS. 8 to 10 show various stages in obtaining a defined shape of the envelope.
Figure 10:

FIGS. 8 to 10 show the shaping of an enveloped product with a defined shape. The strips 23 which in this example have a thickness of 2 mm comprise cavities or cells 25 as already indicated. The volume of the cavities 25 is at least 10% of the strip volume and preferably approximately 25%. The use of a pre-heating furnace 4 in which the thermoplastic as a whole is heated below the melting temperature, in the example chosen at approximately 150° C., is favourable, besides for obtaining in a simple manner a thin surface layer of melted material, for obtaining a rapid plastic deformation of the strip material in shaping the envelope. From the initial position shown in FIG. 8 the dies 24 press on the material of the strips 23 with a previously adjusted maximum pressure. First the cavities or cells 25 of the part 26 are squeezed, which part is present at the height of the body 21 of the electrical component (in this example with a thickness of approximately 2 mm) (FIG. 9). When the movement of the dies is continued the material where the cavities have been squeezed is plastically deformed while simultaneously the edges 27 are squeezed (and possibly plastically deformed) (FIG. 10). It will be obvious that the use of the cavities 25 is very favourable to rapidly shape the strips 23 to form enveloping dishes of a product having a defined outer shape. The plastic deformation of the strip material needs only be small, which, also due to the pre-heating of the strips 23, contributes to a considerable extent to the production rate of enveloping the articles.

The method described is only an example, variations being possible without departing from the scope of this invention. For example, the end of the thermoplastic tape material after clipping to provide a strip 23 may be withdrawn until it is present exactly along the after-heating element 5. The construction of the mould may also be chosen to be different and further variations of the embodiment described are possible.

What is claimed is:

1. A method of permanently enveloping an electrical component in a thermoplastic material, which consists essentially in providing two longitudinal strips of a closed-cell cellular thermoplastic material in parallel spaced relationship to each other, initially heating such parallel strips to a temperature below the softening or melting temperature of the thermoplastic material, thereafter additionally heating only the facing surface of each strip to a temperature above the softening or melting temperature of said thermoplastic material while maintaining the temperature of the remainder of each strip below said softening or melting temperature, introducing said heated strips and said electrical component into a mould in such a manner that the electrical component is positioned between the heated facing surfaces of the strips, the width of the strips being greater than the width of the electrical component, and closing said mould about the strips with the electrical component therebetween so as to encase the electrical component within the strips and to plastically deform the strips to the shape of the mould, the facing surfaces of the strips having been heated only to an extent that, at the time the mould is closed to encase the electrical component within the strips, the temperature gradient resulting from said heating extends from the facing surface of each strip over less than half the thickness thereof.

2. A method according to claim 1, in which the mould includes two dies movable toward each other, the ends of the heated strips and the electrical component being introduced and arranged between the dies; and in which, upon closing of the mould, the dies are moved toward each other and cut lengths from said strips for encasement of the electrical component.

3. A method according to claim 2, in which the strips are progressively heated as the ends of the same are successively introduced and arranged between the dies.

* * * * *